March 26, 1940.    C. W. NESSELL    2,194,986
CONTROL SYSTEM
Original Filed March 9, 1936
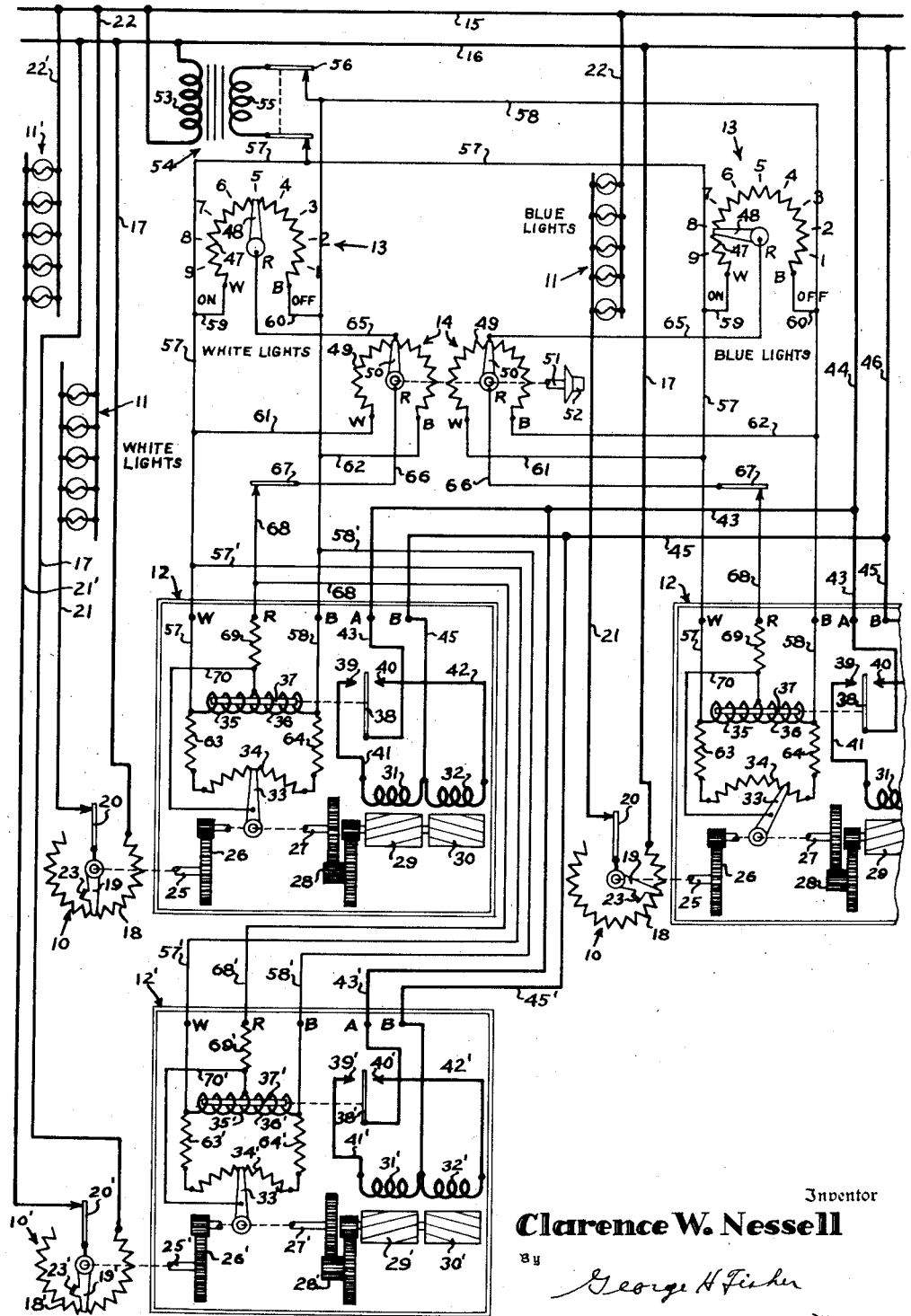
Inventor
Clarence W. Nessell
By George H Fisher
Attorney Patented Mar. 26, 1940

2,194,986

UNITED STATES PATENT OFFICE 2,194,986

CONTROL SYSTEM

Clarence W. Nessell, Dayton, Ohio, assignor to Minneapolis-Honeywell Regulator Company, Minneapolis, Minn., a corporation of Delaware Original application March 9, 1936, Serial No. 67,819. Divided and this application October 31, 1938, Serial No. 237,912

5 Claims. (Cl. 172—239)

This invention relates to control systems in general and this application is a division of my copending application Serial No. 67,819 filed March 9, 1936, for "Lighting control system."

The prime object of this invention is to provide a control system wherein a plurality of regulating devices may be each remotely adjusted to any position along with control means for controlling all of the regulating devices to move them simultaneously to a desired position in such a manner that the regulating devices all arrive at the desired position at the same time regardless of the initial positions of the devices. In other words this invention contemplates originally positioning the regulating devices in desired or initial positions and then additionally positioning all of the regulating devices in such a manner that the ratio of the differences between the positions of the regulating devices remains constant throughout the additional positioning of the regulating devices.

Further objects of this invention are directed at the structure for and the manner of carrying out the above sequences of operation.

Although the control system of this invention is capable of general use it is disclosed for purposes of illustration as applied to a lighting control system for controlling colors and intensities of lights in a theatre lighting system or the like. The single sheet of drawings illustrates diagrammatically the preferred form of this invention.

For purposes of illustration I have shown diagrammatically resistance type dimmer plates generally designated at 10 for controlling a lamp load in the form of lights generally designated at 11. The lamp loads 11 at the left of the drawing are designated "white lights," and those at the right are designated "blue lights." It is within the contemplation of this invention also to vary the lamp loads 11 by any other means known in the art such as core type reactors equipped with choke coils having D. C. fields, the choking effect of which may be governed by potentiometer type resistance dimmer plates instead of the resistance dimmer plates 10 disclosed or by reactors in which the core is rotated. These latter types of control of the lighting loads are usually used for lighting loads of over 10,000 watts, but for purposes of illustration the simplest type is shown in the drawing. The resistance type dimmer plates or the potentiometer type resistance plates for use within core type reactors or the cores themselves may be operated by proportioning motors generally designated at 12. The proportioning motors 12 may in turn be positioned in any number of a plurality of positions by means of control potentiometers generally designated at 13. Fader potentiometers are designated at 14 for also controlling the proportioning motors 12 whereby the proportioning motors 12 may be proportionately moved to "off" or "on" positions in a specific manner to be pointed out more fully hereafter. The control potentiometer 13 at the left of the drawing controls the "white lights" 11 and the control potentiometer 13 at the right of the drawing controls the "blue lights" 11 and these control potentiometers are so designated. The control of the "white lights" and the "blue lights" by the control potentiometers 13 and the proportioning motors 12 are identical, and therefore like reference characters have been utilized throughout.

The dimmer plates 10 and the proportioning motors 12 are preferably located adjacent the lamp loads 11 and the proportioning motors 12 are mechanically connected to the dimmer plates 10. The control potentiometers 13 for controlling the proportioning motors 12 may be located on a panel board located in some convenient place remote from the proportioning motors 12 and the dimmer plates 10. The fader potentiometers 14 may be located if desired on the same panel board with the control potentiometers 13.

Line wires leading from some source of power, not shown, are designated at 15 and 16. The line wire 16 may be connected by a wire 17 to one end of the resistance 18 of the dimmer plate 10. A slider 19 cooperating with the resistance 18 is connected by a switch 20 and a wire 21 to the lights 11 forming the lamp load. The lights 11 are in turn connected by a wire 22 to the other line wire 15. The lights 11 are located in parallel and the resistance 18 is located in series with the lights. It is therefore seen that as the slider 19 is moved in a counter-clockwise direction the light intensities of the lamps 11 are increased and when the slider 19 is moved in a clockwise direction the light intensities of the lamps 11 are decreased. The slider 19 may be provided with an abutment 23 which is adapted to engage the switch 20 when all of the resistance 18 is placed in circuit with the lamps 11. This abutment 23 is adapted to open the switch 20 to interrupt the supply of current to the lights 11. The light intensities of the lamps 11 are thus adjusted and when they are dimmed to a predetermined intensity they may be extinguished.

The sliders 19 may be rotated by the proportioning motors 12 through the medium of a shaft 25 which may be driven through suitable gearing 26 by a motor shaft 27. The motor shaft 27 is in turn rotated through reduction gearing 28 by motor rotors 29 and 30 upon energization of field windings 31 and 32. The shaft 27 also rotates a slider 33 with respect to a balancing potentiometer coil 34. The arrangement is such that when the field winding 31 is energized the slider 19 associated with the resistance 18 is rotated in a clockwise direction to dim the lights 11 and the slider 33 is rotated to the left with respect to the balancing potentiometer coil 34. When the field winding 32 is energized the slider 19 is moved in a counter-clockwise direction with respect to the resistance 18 to brighten the lamps 11, and the slider 33 is moved to the right with respect to the balancing potentiometer coil 34.

Proportioning motor 12 also includes a relay comprising coils 35 and 36 for operating a core 37 which is suitably connected to a switch arm 38. The switch arm 38 is adapted to cooperate with spaced contacts 39 and 40. When the relay coil 35 is energized more than the relay coil 36, switch arm 38 is moved into engagement with the contact 39 and when the relay coil 36 is energized more than the relay coil 35 the switch arm 38 is moved into engagement with the contact 40. When the relay coils 35 and 36 are equally energized or when they are deenergized the switch arm 38 is maintained in a position midway between the contacts 39 and 40 as shown in the drawing. For a further detailed understanding of the proportioning motor 12 reference is made to application Serial No. 673,236 filed by Lewis L. Cunningham on May 27, 1933.

The contact 39 is connected by wire 41 to one end of the field winding 31 and likewise the contact 40 is connected by a wire 42 to one end of the field winding 32. The switch arm 38 is connected by wires 43 and 44 to the line wire 15 and the junction of the field windings 31 and 32 is connected by wires 45 and 46 to the other line wire 16. When the switch arm 38 is moved into engagement with the contact 39, a circuit is completed from the line wire 15 through wires 44 and 43, switch arm 38, contact 39, wire 41, field winding 31 and wires 45 and 46 back to the other line wire 16. Completion of this circuit causes energization of the field winding 31 to dim the lights 11 in the manner pointed out above. Movement of the switch arm 38 into engagement with the contact 40 completes a circuit from the line wire 15 through wires 44 and 43, switch arm 38, contact 40, wire 42, field winding 32 and wires 45 and 46 back to the other line wire 16. Completion of this circuit causes energization of the field winding 32 to cause brightening of the lights 11. When the switch arm 38 is in the mid-position shown in the drawing, neither field winding 31 or 32 is energized and the slider 19 is maintained in a given position to maintain the light intensities of the lamps 11 at the adjusted value. Suitable limit switches, not shown, may be provided in the wires 41 and 42 to prevent overtravel of the proportioning motor 12 and consequent overtravel of the slider 19 with respect to the resistance 18.

The control potentiometer generally designated at 13 may comprise a potentiometer coil 47 and a manually operated slider 48 cooperating therewith. Suitable indications may be associated with the slider 48 to indicate the light intensities which the lamps 11 will assume when the slider coincides with certain of the indications. The fader potentiometers 14 may comprise potentiometer coils 49 and sliders 50 cooperating therewith. Preferably the sliders 50 are mounted on a common shaft 51 whereby the sliders 50 of both fader potentiometers 14 are simultaneously rotated. The shaft 51 is shown to be operated by a knob 52, although the shaft 51 may be operated in any suitable manner such as by a timing motor or by a remotely controlled motor similar to proportioning motor 12.

The primary 53 of a step-down transformer 54 having a secondary 55 is connected across the line wires 15 and 16. The secondary 55 is connected to a double pole single throw switch 56. One of the poles of switch 56 is connected by a wire 57 to one end of the relay coil 35. The other pole of the switch 56 is connected by a wire 58 to one end of the relay coil 36. The left-hand end of the potentiometer coil 47 of the control potentiometer 13 is connected by wire 59 to the wire 57, and likewise the right-hand end of the potentiometer coil 47 is connected by wire 60 to the wire 58. The left-hand end of the potentiometer coil 49 of the fader potentiometer 14 is connected by wire 61 to the wire 57 and likewise the right-hand end of the potentiometer coil 49 is connected by wire 62 to the wire 58. The left-hand end of the balancing potentiometer coil 34 is connected by a protective resistance 63 to the left-hand end of the relay coil 35 and likewise the right-hand end of the balancing potentiometer coil 34 is connected by a protective resistance 64 to the right-hand end of the relay coil 36. In this manner it is seen that the potentiometer coils 47 of the control potentiometer 13, 49 of the fader potentiometer 14, and 34 of the balancing potentiometer and the relay coils 35 and 36, are all connected in parallel and across the secondary 55 of the step-down transformer 54 when the double pole single throw switch 56 is closed. The slider 48 of the control potentiometer 13 is connected by a wire 65 to the center of the potentiometer coil 49 of the fader potentiometer 14. The slider 50 of the fader potentiometer 14 is connected by a wire 66, a switch 67, a wire 68 and a resistance 69 to the junction of the relay coils 35 and 36. The junction of the relay coils 35 and 36 is also connected by a wire 70 to the slider 33 associated with the balancing potentiometer coil 34. When the switch 67, which may be manually operated, is closed and when the slider 50 of the fader potentiometer 44 is in the mid position, the slider 48 of the control potentiometer 13, the slider 33 of the balancing potentiometer, and the junction of the relay coils 35 and 36 are connected together.

Referring now to the upper left-hand portion of the drawing, which relates to the control of the "white lights," it is assumed that the parts are in the position shown. Relay coils 35 and 36 are equally energized by reason of the above referred to parallel relationship and by reason of the sliders 33 and 50 being in the mid position with respect to their potentiometer coils. Movement of the slider 48 to the left towards the "on" position causes partial short-circuiting of the relay coil 35 to decrease the energization thereof and increase the energization of the relay coil 36. This unbalanced relationship of the relay coils 35 and 36 is afforded by the parallel relationship pointed out above. This unbalanced relationship causes movement of the switch arm 38 into engagement with the contact 40 to increase the light intensities of the lights 11 in the manner pointed out above and to rotate the slider 33 towards the right with respect to the balancing potentiometer coil 34. Movement of the slider 33 towards the right causes partial short-circuiting of the relay coil 36 to decrease the energization thereof and increase the energization of the relay coil 35, it being remembered that the relay coil 36 was energized more than the relay coil 35 by reason of the left hand movement of the slider 48 of the control potentiometer 13. When the slider 33 has moved sufficiently far to the right to rebalance the energizations of the relay coils 35 and 36 the switch arm 38 is moved out of engagement with the contact 40 to the mid position shown to prevent further counter-clockwise movement of the slider 19 and consequent brightening of the lamps 11.

Movement of the slider 48 of the control potentiometer 13 to the right towards the "off" position causes partial short-circuiting of the relay coil 36 to decrease the energization thereof and increase the energization of the relay coil 35. This causes movement of the switch arm 38 into engagement with the contact 39 to rotate the slider 19 in a clockwise direction to dim the lights 21 and also to rotate the slider 33 to the left with respect to the balancing potentiometer coil 34. Movement of the slider 33 to the left with respect to the balancing potentiometer coil 34 causes partial short-circuiting of the relay coil 35 to decrease the energization thereof and increase the energization of the relay coil 36, it being remembered that the relay coil 35 was energized more than the relay coil 36 by reason of the right-hand movement of the control slider 48. When the slider 33 has moved sufficiently far to the left so as to rebalance the energizations of the relay coils 35 and 36 the switch arm 38 is moved out of engagement with the contact 39 to the mid position shown. This stops the further clockwise rotation of the slider 19 and further dimming of the lights 11 is thereby prevented.

In this manner the slider 19 of the dimmer plate 10 may be made to follow the slider 48 of the control potentiometer 13 whereby the light intensities of the lamps 11 may be adjusted to any position desired by manually manipulating the slider 48 of the control potentiometer 13. When the slider 48 of the control potentiometer 13 is moved to the complete "off" position the relay coil 36 is substantially completely short-circuited and the slider 19 of the dimmer plate 10 is moved to a complete clockwise position to open the switch 20 to extinguish the lights 11. Likewise, movement of the slider 48 of the control potentiometer 13 to the full "on" position, the relay coil 35 is substantially completely short-circuited to move the slider 19 of the dimmer plate 10 to the extreme counter-clockwise position whereby the lights 11 are brightened to their fullest extent.

After the slider 48 of the control potentiometer 13 has been moved to a desired position to adjust the light intensities of the lamps 11 and the light intensities of these lamps have been so adjusted in the manner pointed out above, the double pole single throw switch 56 may be opened to break the supply of electrical power to the relay coils 35 and 36 of the proportioning motor 12. The proportioning motor 12 and consequently the dimmer plate 10 will remain in this adjusted position, since the switch arm 38 is maintained in a mid position with respect to the contacts 39 and 40 when the coils 35 and 36 are de-energized. The slider 48 of the control potentiometer 13 may be then moved to another position but this will not cause operation of the slider 19 of the dimmer plate 10, since the control circuit is rendered inoperative by reason of the switch 56 being open. In this manner the control potentiometer 13 may be preset while the proportioning motor 12 is maintained in a desired position. When the switch 56 is subsequently closed to again supply electrical power to the control system, the slider 19 of the dimmer plate 10 is rotated to a position to correspond with that of the control slider 48 to readjust the light intensities of the lights 11. Therefore, the light intensities of the lamps 11 may be adjusted to one value and maintained at that value while the control slider 48 of the control potentiometer 13 is being moved to another position. Subsequently, when the switch 56 is closed the light intensities of the lights 11 are then adjusted to the new position according to the new position of the control slider 48. If the switch 56 is maintained closed the light intensities of the lamps 21 may be modulated or faded by slowly rotating the control slider 48.

Opening of the manual switch 67 breaks the connection between the slider 48 of the control potentiometer 13 and the junction of the relay coils 35 and 36. This prevents the control potentiometer 13 from unbalancing the relay coils 35 and 36 whereby the control potentiometer 13 is rendered ineffective to control the proportioning motor 12.

The above described mode of operation, wherein the proportioning motor 12 and consequently the dimmer plate 10 are positioned in accordance with the positioning of the control potentiometer 13, was predicated on the fact that the sliders 50 of the fader potentiometers 14 were located in the mid position shown in the drawing. This mid position of the sliders 50 connects the slider 48 of the control potentiometer 13 directly to the junction of the relay coils 35 and 36, whereby the fader potentiometer coils 14 have no effect upon the relay coils 35 and 36. As pointed out above, the fader potentiometers 14 are connected in parallel with the relay coils 35 and 36. By reason of this parallel relationship movement of the slider 50 towards the right from the mid position shown decreases the energization of the relay coil 36 and increases the energization of the relay coil 35 in exactly the same manner as does right-hand movement of the slider 48 of the control potentiometer 13. This right-hand movement of the slider 50 therefore operates the proportioning motor 12 to move the slider 19 of the dimmer plate in a clockwise direction. When the slider 50 is moved to the complete right-hand position the relay coil 36 is substantially completely short-circuited whereby the lights 11 are extinguished. In this connection it is pointed out that as the slider 50 of the fader potentiometer 14 is moved towards the right from the mid position shown, resistance is added in series with the slider 48 of the control potentiometer 13, this resistance being progressively placed in series with the slider 48 of the control potentiometer 13 and therefore progressively rendering the control potentiometer 13 less effective to control the energizations of the relay coils 3 and 36. Therefore, whatever position the slider 48 of the control potentiometer 13 may assume, movement of the slider 50 of the fader potentiometer 14 from the mid position shown in the drawing to the extreme right-hand position causes extinguishment of the lights 11.

Conversely, movement of the slider 50 of the fader potentiometer 14 to the left from the mid position shown in the drawing to the complete left-hand position progressively operates the proportioning motor 12 to move the slider 19 of the dimmer plate 10 to a complete counter-clockwise position whereby the intensities of the lights 11 are increased to 100% brilliancy. Left-hand movement of the slider 50 of the fader potentiometer 14 also adds resistance in series with the slider 48 of the control potentiometer 13 to render the control potentiometer 13 progressively less effective to control the proportioning motor 12. Therefore, as the sliders 50 of the fader potentiometers 14 are moved from the mid position to either extreme position the control of the proportioning motors 12 is gradually taken away from the control potentiometer 13 and the proportioning motors 12 are operated to either extinguish the lights 11 or to increase the light intensities thereof to 100%, dependent upon which way the sliders 50 are moved.

As pointed out above, the sliders 50 of the fader potentiometers 14 are connected together for simultaneous movement, whereupon the proportioning motors 12 associated with the respective fader potentiometers 14 are moved to either extreme position depending upon the direction of movement of the sliders 50. As shown in the drawing, the control potentiometer 13 for the "white lights" is in a mid position and therefore the "white lights" are at 50% brilliancy. The control potentiometer 13 for the "blue lights" is in a three-quarters "on" position whereby the light intensities of the "blue lights" are substantially 75%. If the sliders 50 of the fader potentiometers 14 are moved at a rate slower than the maximum rate of movement of the proportioning motors 12, the proportioning motors 12 will be moved towards either extreme position and both proportioning motors 12 will arrive at that extreme position at exactly the same time. Specifically, movement of the sliders 50 towards the right causes movement of the proportioning motors 12 towards the "off" position whereby the lights 11 are extinguished and the "white lights" and the "blue lights" are extinguished at exactly the same time. Similarly, movement of the sliders 50 towards the left causes operation of the proportioning motors 12 to increase the intensities of the lights to 100%, and the "white lights" and the "blue lights" will be adjusted to this 100% brilliancy at exactly the same time. Therefore, it follows that no matter what position the proportioning motors 12 may be in these proportioning motors may be moved to either extreme position under the control of the fader potentiometers 14 and will arrive at these extreme positions at exactly the same time. By reason of this construction true proportionate dimming or brightening of the lights are obtained, whereby accurate blending of the various colors of lights is obtained.

Assume now that the sliders 50 of the fader potentiometers 14 are in the extreme right-hand position. The proportioning motors 12 are therefore maintained in such position as to maintain the lights 11 extinguished. The sliders 48 of the control potentiometers 13 may therefore be adjusted to any desired position but the motors 12 will remain in the "off" position. Movement of the sliders 50 from the extreme right-hand position to the mid position shown in the drawing gradually places the control of the proportioning motors 12 under the control of their respective control potentiometers 13, and when the sliders 50 are finally moved to the mid position shown in the drawing the proportioning motors 12 will assume positions corresponding to the positions of their respective control potentiometers 13, and if the sliders 50 of the fader potentiometers 14 are moved at a rate slower than the maximum speed of the proportioning motors 12, the proportioning motors 12 will arrive at their desired positions at exactly the same time. In this manner the lights may be brightened in a proportionate manner from an "off" condition to a desired condition and the rate of travel of the proportioning motors 12 is so controlled that the proportioning motors 12 will arrive at their desired positions at exactly the same time. By use of the above construction true proportionate dimming and true proportionate brightening of the various lights are obtained.

Generally speaking, the maximum electrical capacity of a single dimmer plate is about 3600 watts. It may be desired to control a lamp load greater than 3600 watts from a single control potentiometer 13. This may be accomplished in two ways: One, by using the core type reactor for controlling the lamp load as pointed out above, or, two, by using a plurality of resistance type dimmer plates, and this latter method is disclosed in the drawing. The lighting load, designated as "white lights," may be split up into two loads 11 and 11', the load 11 being controlled by the resistance type dimmer plate 10 in the manner pointed out above, and the load 11' being controlled by the resistance type dimmer plate 10'. The dimmer plate 10' may be controlled by another proportioning motor 12', the construction of which is identical with that of 12. The motor 12' may be supplied with power from the line wires 15 and 16 by wires 43', 43 and 44 and 45', 45 and 46. The relay coils 35' and 36' may be connected to the control potentiometer 13 by wires 57', 58' and 68' in the same manner that the relay coils 35 and 36 of the proportioning motor 12 are connected thereto. The resistances 69 and 69' in the proportioning motors 12 and 12' are provided so that the two proportioning motors 12 and 12' will operate identically in response to movement of the control slider 48 of the control potentiometer 13, or in response to the slider 50 of the fader potentiometer 14. The specific manner in which this mode of operation is accomplished is set forth in United States Patent No. 2,114,704 granted to Lewis L. Cunningham and myself on April 19, 1938. By reason of this construction a single control potentiometer identically positions two or more resistance type dimmer plates. Like elements of the proportioning motor 12' have been designated by like reference characters primed so that the operation of the proportioning motor 12' may be easily followed upon reference to the operation of the proportioning motor 12.

Although for purposes of illustration one form of this invention has been disclosed, other forms thereof may become apparent to those skilled in the art upon reference to this disclosure and therefore this invention is to be limited only by the scope of the appended claims and prior art.

I claim as my invention:

1. In a control system, the combination of a motor for performing a function, a balanced relay for operating said motor comprising series connected coils, two resistances connected in parallel with said series connected coils, and a slider for each resistance, the slider of one resistance being connected to a center tap of the other resistance, and the slider of the other resistance being connected to the junction of the series connected coils whereby the balanced relay is operated to operate the motor.

2. In a control system, the combination of a motor for performing a function, switching mechanism for operating said motor, series connected coils for operating said switching mechanism, two control resistances connected in parallel with said series connected coils, a slider for each resistance, the slider of one resistance being connected substantially to the center of the other resistance and the slider of the other resistance being connected between the series connected coils whereby the switching mechanism is operated to operate said motor, and means operated by said motor for operating the switching mechanism to stop operation of the motor.

3. In a control system, the combination of a motor for performing a function, switching mechanism for operating said motor, series connected coils for operating said switching mechanism, two control resistances connected in parallel with said series connected coils, a slider for each resistance, the slider of one resistance being connected substantially to the center of the other resistance and the slider of the other resistance being connected between the series connected coils, another resistance connected in parallel with said series connected coils, and a slider cooperating therewith and operated by said motor, the slider being connected between the series connected coils.

4. In a control system, the combination of a plurality of motors, switching mechanism for each motor for controlling the operation thereof, series connected coils for operating each switching mechanism, at least two resistances connected in parallel with the series connected coils of each switching mechanism, a slider for each resistance, the slider of one resistance being connected substantially to the center of another resistance and the slider of the other resistance being connected between the series connected coils whereby each series connected coils are controlled by its associated resistances, and means for simultaneously operating the second mentioned sliders.

5. In a control system, the combination of a plurality of motors, switching mechanism for each motor for controlling the operation thereof, series connected coils for operating each switching mechanism, at least two resistances connected in parallel with the series connected coils of each switching mechanism, a slider for each resistance, the slider of one resistance being connected substantially to the center of another resistance and the slider of the other resistance being connected between the series connected coils, another resistance connected in parallel with each series connected coils, a slider cooperating therewith and connected between its associated series connected coils, means for operating the last mentioned sliders upon operation of their respective motors, and means for simultaneously operating the second mentioned sliders.

CLARENCE W. NESSELL.